(12) United States Patent
Weber et al.

(10) Patent No.: US 8,168,719 B2
(45) Date of Patent: May 1, 2012

(54) THERMOPLASTIC MOLDING COMPOUND WITH PROCESSING-INDEPENDENT VISCOSITY

(75) Inventors: Martin Weber, Maikammer (DE); Achim Datko, Leimen (DE); Ludger Leber, Dannstadt-Schauernheim (DE)

(73) Assignee: Styrolution GmbH, Ludwigshafen (DE)

( * ) Notice: Subject to any disclaimer, the term of this patent is extended or adjusted under 35 U.S.C. 154(b) by 187 days.

(21) Appl. No.: 12/598,938

(22) PCT Filed: Apr. 23, 2008

(86) PCT No.: PCT/EP2008/054884
§ 371 (c)(1),
(2), (4) Date: Nov. 5, 2009

(87) PCT Pub. No.: WO2008/135384
PCT Pub. Date: Nov. 13, 2008

(65) Prior Publication Data
US 2010/0130685 A1     May 27, 2010

(30) Foreign Application Priority Data
May 7, 2007    (EP) .................................... 07107618

(51) Int. Cl.
C08L 51/00 (2006.01)
C08L 33/08 (2006.01)
C08L 25/12 (2006.01)
B29C 45/00 (2006.01)

(52) U.S. Cl. .......................................... 525/80; 525/83
(58) Field of Classification Search .................... 525/80, 525/83
See application file for complete search history.

(56) References Cited

U.S. PATENT DOCUMENTS

| | | | |
|---|---|---|---|
| 2,820,018 A * | 1/1958 | Nason ............................ | 524/208 |
| 6,087,449 A | 7/2000 | Tiefensee et al. | |
| 2007/0260015 A1 | 11/2007 | Stork et al. | |
| 2008/0293011 A1* | 11/2008 | Hashiguchi et al. ....... | 433/168.1 |

FOREIGN PATENT DOCUMENTS

| | | |
|---|---|---|
| DE | 2427960 B1 | 6/1975 |
| DE | 102004059243 A1 | 2/2006 |
| GB | 1472195 | 5/1977 |
| WO | WO-97/08241 A1 | 3/1997 |
| WO | WO-01/83574 A1 | 11/2001 |
| WO | WO-0210222 A1 | 2/2002 |
| WO | WO-2006/018178 A1 | 2/2006 |
| WO | WO2006087961 * | 8/2006 |

OTHER PUBLICATIONS

Rehberg et al. Journal of Industrial and Engineering Chemistry (Washington, D.C.), 44, 2864-6 (1952).*
International Preliminary Report on Patentability (IPRP) of International application PCT/EP2008/054884, issued Dec. 7, 2009.

* cited by examiner

Primary Examiner — Jeffrey Mullis
(74) Attorney, Agent, or Firm — Connolly Bove Lodge & Hutz LLP

(57) ABSTRACT

The present invention relates to thermoplastic molding compositions comprising a mixture composed of (A) at least one methyl methacrylate polymer, (B) at least one copolymer, obtainable via polymerization of a mixture, composed of (B1) at least one vinylaromatic monomer, and (B2) at least one vinyl cyanide, as monomers, (C) at least one graft polymer, obtainable from a core, and a first graft shell, and a second graft shell, (D) at least one polybutyl acrylate whose molar mass is from 1700 to 4000 g/mol (determined as $M_w$ by means of gel permeation chromatography), and (E) if appropriate conventional additives, as component (E), to a process for preparation of these thermoplastic molding compositions, to the use of this thermoplastic molding composition for production of moldings, and also to the use of styrene-methyl methacrylate copolymers whose molar mass is from 1700 to 4000 g/mol (determined as $M_w$ by means of gel permeation chromatography) for improvement of flowability and for reduction of the dependency of notched impact strength and haze values of thermoplastic molding compositions on injection-molding conditions.

20 Claims, No Drawings

THERMOPLASTIC MOLDING COMPOUND WITH PROCESSING-INDEPENDENT VISCOSITY

CROSS REFERENCE TO RELATED APPLICATIONS

This application is a national phase of PCT/EP2008/054884, filed on Apr. 23, 2008 which claims priority to EP 07107618.6 filed May 7, 2007, the entire contents of all are hereby incorporated by reference.

The present invention relates to a thermoplastic molding composition comprising a mixture composed of (A) at least one methyl methacrylate polymer, (B) at least one copolymer, (C) at least one graft copolymer, (D) at least one polybutyl acrylate whose molar mass is from 1700 to 4000 g/mol (determined as $M_w$ by means of gel permeation chromatography), as component (D), and (E) if appropriate conventional additives, as component (E). The present invention further relates to a process for preparation of this thermoplastic molding composition, to its use, and to the moldings obtainable therefrom.

Thermoplastic molding compositions are known from the prior art.

WO 97/08241 discloses molding compositions which are composed of a hard methyl methacrylate polymer, a hard polymer of vinylaromatic monomers and vinyl cyanide, and a soft graft copolymer comprising an elastomeric graft core, a first graft shell composed of a polymer composed of a vinylaromatic monomer and an alkyl methacrylate, and a second graft shell composed of an alkyl (meth)acrylate polymer. These molding compositions feature good impact strength, high flowability, high light transmittance, low haze, and little yellow tinge at their edges. However, for some application sectors, for example for use as cosmetics packaging, these molding compositions still require improvement in terms of their chemical and physical resistance when exposed to chemicals or solvents.

WO 2006/018178 A1 discloses thermoplastic molding compositions comprising a mixture composed of a methyl methacrylate polymer, a copolymer, obtainable via polymerization of a vinylaromatic monomer and a vinyl cyanide, a graft copolymer, obtainable from a core, obtainable via polymerization of a 1,3-diene and a vinylaromatic monomer, a first graft shell, obtainable via polymerization of a vinylaromatic monomer, a $C_1$-$C_8$-alkyl methacrylate, and a crosslinking monomer, a second graft shell composed of an alkyl (meth)acrylate polymer and at least one highly branched or hyperbranched polymer, selected from the group of highly branched or hyperbranched polycarbonates or highly branched or hyperbranched polyesters. These thermoplastic molding compositions have improved flow properties and improved demolding properties, but the thermal stability of the molding compositions according to WO 2006/018178 A1 still requires improvement.

It is therefore an object of the present invention to provide thermoplastic molding compositions based on hard methyl methacrylate polymers, hard polymers composed of vinylaromatic monomers, and vinyl cyanides, and soft graft copolymers, where they, when compared with comparable thermoplastic molding compositions of the prior art, have not only improved flowability but also at least comparably good optical properties, in particular comparably good transparency and low light scattering. A further object is to provide thermoplastic molding compositions which have not only improved flowability but also reduced dependency of toughness on processing conditions.

These objects are achieved via a thermoplastic molding composition, comprising a mixture composed of
(A) at least one methyl methacrylate polymer, obtainable via polymerization of a mixture, composed of
  (A1) methyl methacrylate, and
  (A2) at least one $C_1$-$C_8$-alkyl acrylate, as monomers,
as component (A),
(B) at least one copolymer, obtainable via polymerization of a mixture, composed of
  (B1) at least one vinylaromatic monomer, and
  (B2) at least one vinyl cyanide, as monomers,
as component (B),
(C) at least one graft copolymer, obtainable from
  (C1) a core, and
  (C2) a first graft shell, obtainable via polymerization of a monomer mixture, composed of
    (C21) at least one vinylaromatic monomer,
    (C22) at least one $C_1$-$C_8$-alkyl methacrylate, and
    (C23) if appropriate, at least one crosslinking monomer, as monomers, and
  (C3) a second graft shell, obtainable via polymerization of a monomer mixture, composed of
    (C31) at least one $C_1$-$C_8$-alkyl methacrylate, and
    (C32) at least one $C_1$-$C_8$-alkyl acrylate, as monomers,
as component (C),
(D) at least one polybutyl acrylate whose molar mass is from 1700 to 4000 g/mol (determined as $M_w$ by means of gel permeation chromatography),
as component (D), and
(E) if appropriate conventional additives, as component (E).

The objects are also achieved via a process for preparation of the inventive thermoplastic molding composition, via a molding, comprising an inventive thermoplastic molding composition, via the use of an inventive thermoplastic molding composition for production of moldings, and via the use of polybutyl acrylate whose molar mass is from 1700 to 4000 g/mol (determined as $M_w$ by means of gel permeation chromatography) for improvement of flowability and for reduction of the dependency of notched impact strength and haze values of thermoplastic molding compositions.

The inventive molding compositions have not only improved flowability but also reduced dependency of toughness on processing conditions. It has been found that use of the inventive component D gives not only improved flowability but also reduced dependency of notched impact strength and haze values on injection-molding conditions. Molding compositions which comprise, as component D, a product whose molar mass is from 1700 to 4000 g/mol (determined as Mw by means of GPC, THF eluent, 23° C., polystyrene calibration) also feature a low level of mold deposit.

In one preferred embodiment, the inventive thermoplastic molding composition comprises
  an amount of from 20 to 68.9% by weight, particularly preferably from 27.5 to 62.3% by weight, based in each case on the entirety of components (A) to (D), of component (A),
  an amount of from 20 to 69% by weight, particularly preferably from 30 to 62.5% by weight, based in each case on the entirety of components (A) to (D), of component (B),
  an amount of from 1 to 60% by weight, particularly preferably from 10 to 45% by weight, based in each case on the entirety of components (A) to (D), of component (C),
  an amount of from 0.1 to 5% by weight, particularly preferably from 0.2 to 3% by weight, based on the entirety of components (A) to (D), of component (D), and an amount of from 0 to 20% by weight, particularly preferably from 0 to 15% by weight. based on the entirety of components (A) to (D), of component (E).

The entirety of components (A) to (D) or, respectively, (A) to (E) present in the molding composition amounts to 100% by weight.

A more detailed description follows of the individual components (A) to (E) of the inventive thermoplastic molding composition:

Component (A):

The inventive thermoplastic molding composition comprises, as component (A), at least one methyl methacrylate polymer obtainable via polymerization of a mixture composed of (A1) methyl methacrylate and (A2) at least one $C_1$-$C_8$-alkyl acrylate as monomers.

The methyl methacrylate polymers (A) present in the inventive thermoplastic molding compositions are either homopolymers composed of methyl methacrylate (MMA) or copolymers composed of MMA with up to 10% by weight, based on (A), of a $C_1$-$C_8$-alkyl acrylate.

In one preferred embodiment, in component (A), the amount present of (A1) is from 90 to 100% by weight, particularly preferably from 92 to 98% by weight and the amount present of (A2) is from 0 to 10% by weight, particularly preferably from 2 to 8% by weight based in each case on (A).

The $C_1$-$C_8$-alkyl acrylate (component A2) used may be one selected from the group consisting of methyl acrylate, ethyl acrylate, propyl acrylate, n-butyl acrylate, n-pentyl acrylate, n-hexyl acrylate, n-heptyl acrylate, n-octyl acrylate, 2-ethylhexyl acrylate, and mixtures of these, preferably selected from methyl acrylate, ethyl acrylate, n-butyl acrylate, 2-ethylhexyl acrylate, and mixtures of these, particularly preferably methyl acrylate.

The methyl methacrylate (MMA) polymers can be prepared via bulk, solution, or bead polymerization, by known methods (see, for example, Kunststoff-Handbuch [Plastics handbook], volume IX, "Polymethacrylates", Vieweg/Esser, Carl-Hanser-Verlag 1975, pages 8-56) and are commercially available. It is preferable to use methyl methacrylate polymers whose weight-average molar mass values $M_w$ are in the range from 60 000 to 300 000 g/mol (determined via light scattering in chloroform).

Component B:

Component (B) is a copolymer composed of at least one vinylaromatic monomer (B1) and of at least one vinyl cyanide (B2) as monomers.

In one preferred embodiment, in component (B) the amount present of (B1) is from 75 to 88% by weight, particularly preferably from 79 to 85% by weight and the amount present of (B1) is from 12 to 25% by weight, particularly preferably from 15 to 21% by weight based in each case on (B).

The vinylaromatic monomer (component B1) used can be styrene, styrene substituted by from one to three $C_1$-$C_8$-alkyl radicals, e.g. p-methylstyrene or tert-butylstyrene, or else α-methylstyrene, preferably styrene.

The vinyl cyanide (component B2) used can be acrylonitrile and/or methacrylonitrile, preferably acrylonitrile.

Outside the range stated above for the constitution of component (B), cloudy molding compositions having streaks are usually obtained at processing temperatures above 240° C.

The copolymers (B) can be prepared by known processes, for example via bulk, solution, suspension, or emulsion polymerization, preferably via solution polymerization, see GB-A 14 72 195. Preference is given here to copolymers (B) whose molar masses $M_w$ are from 60 000 to 300 000 g/mol, determined via light scattering in dimethylformamide.

Component C:

The component (C) used comprises a graft copolymer, composed of a core (C1) and of two graft shells (C2) and (C3) applied thereto.

In one preferred embodiment, in component (C) of the inventive thermoplastic molding composition, the amount present of (C1) is from 60 to 90% by weight, particularly preferably from 70 to 80% by weight, the amount present of (C2) is from 5 to 20% by weight, particularly preferably from 10 to 15% by weight, and the amount present of (C3) is from 5 to 20% by weight, particularly preferably from 10 to 15% by weight, based in each case on (C).

In one preferred embodiment, the core (C1) is obtainable via polymerization of a monomer mixture composed of (C11) from 65 to 90% by weight, based on (C1), of a 1,3-diene, (C12) from 10 to 35% by weight, based on (C1), of a vinylaromatic monomer, and (C13) from 0 to 5% by weight, based on (C1), of an agglomeration polymer, as monomers.

The core (C1) is obtainable via polymerization of a monomer mixture which in one inventive embodiment is composed of components (C11) and (C12), and in another embodiment is composed of components (C11), (C12), and (C13), in each case as monomers.

If (C13) is absent from the monomer mixture, the amount present of (C11) is preferably from 65 to 90% by weight, particularly preferably from 70 to 85% by weight, and the amount present of (C12) is preferably from 10 to 35% by weight, particularly preferably from 15 to 30% by weight, in each case based on (C1).

If (C13) is present in the monomer mixture, the amount present of (C11) is preferably from 65 to 89.9% by weight, particularly preferably from 70 to 84.5% by weight, the amount of (C12) present is preferably from 10 to 34.9% by weight, particularly preferably from 15 to 29.5% by weight, and the amount of (C13) present is preferably from 0.1 to 5% by weight, preferably from 0.5 to 2% by weight, in each case based on (C1).

The core (C1) is the graft base, and its swelling index SI is from 15 to 50, in particular from 20 to 40, determined via measurement of swelling in toluene at room temperature.

Butadiene and/or isoprene can be used as 1,3-diene (component C11) of the core of the graft copolymer.

The vinylaromatic monomer (component C12) used can be styrene or preferably styrene substituted on the ring by a $C_1$-$C_8$-alkyl group, preferably in α-position, or else by a plurality of $C_1$-$C_8$-alkyl groups, methyl being preferred.

The agglomeration polymer (component C13) used can be substances described by way of example in WO 01/83574, WO 02/10222, or DE-A 24 27 960 and known to the person skilled in the art. Suitable agglomeration polymers are, by way of example, dispersions of acrylate polymers, preferably of copolymers composed of ethyl acrylate and methacrylamide, in which the proportion of methacrylamide is from 0.1 to 20% by weight, based on the copolymer. The concentration of the acrylate polymers in the dispersion of the agglomeration polymer is preferably from 3 to 40% by weight, particularly preferably from 5 to 20% by weight.

The core (C1) is prepared by processes known to the person skilled in the art and described by way of example in Encyclopedia of Polymer Science and Engineering, Vol. 1, pp. 401 et seq. In the absence of (C13), components (C11) and (C12) are used in processes known to the person skilled in the art, for example emulsion polymerization, to prepare a core, whose glass transition temperature is preferably below 0° C., and whose average particle size $D_{50}$ is generally in the range from 30 to 240 nm, preferably in the range from 50 to 180 nm.

If component (C13) is present in the graft core, the reaction of the core obtained in the first stage with the agglomeration polymer (C13) takes place by processes known to the person skilled in the art and described by way of example in Encyclopedia of Polymer Science and Engineering, Vol. 1, pp. 401 et seq., the average particle size $D_{50}$ of the core (C1) obtained being in the range from 300 to 400 nm, preferably from 320 to 380 nm, particularly preferably from 340 to 360 nm. The particle size $D_{50}$ is determined by means of an analytical ultracentrifuge by the method of W. Scholtan and H. Lange, Kolloid-Z., and Z.-Polymere 250 (1972), pages 782-796, in the form of weight-average particle size. In the presence of component (C13), the core (C1) has monomodal particle size distribution.

The first graft shell (C2) is grafted onto the core (C1) and comprises the monomers (C21), (C22), and, if appropriate, (C23).

The vinylaromatic monomer (component C21) used can be styrene or preferably styrene substituted on the ring by a $C_1$-$C_8$-alkyl group, preferably in α-position, or else by a plurality of $C_1$-$C_8$-alkyl groups, methyl being preferred.

According to the invention, the $C_1$-$C_8$-alkyl methacrylate (component C22) used comprises methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate, or 2-ethylhexyl methacrylate, or else a mixture of these monomers, particular preference being given to methyl methacrylate.

The monomers (C23) used can be conventional crosslinking monomers, i.e. in essence di- or polyfunctional comonomers, in particular alkylene glycol di(meth)acrylates, such as ethylene glycol di(meth)acrylate, propylene glycol di(meth)acrylate, and butylene glycol di(meth)acrylate, allyl methacrylate, (meth)acrylates of glycerol, trimethylolpropane, pentaerythritol, or vinylbenzenes, such as di- or trivinylbenzene. Preference is given to use of butylene glycol dimethacrylate, butylene glycol diacrylate, and dihydrodicyclopentadienyl acrylate in the form of an isomer mixture, particular preference being given to use of dihydrodicyclopentadienyl acrylate in the form of an isomer mixture.

A second graft shell (C3) is in turn applied to the first graft shell (C2) and comprises the monomers (C31) and (C32).

The monomers (C31) are $C_1$-$C_8$-alkyl methacrylates, and the monomers (C32) are $C_1$-$C_8$-alkyl acrylates.

According to the invention, the $C_1$-$C_8$-alkyl methacrylates (monomers C31) used comprise methyl methacrylate (MMA), ethyl methacrylate. n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate, or 2-ethylhexyl methacrylate, or else a mixture of these monomers, particular preference being given to methyl methacrylate.

The $C_1$-$C_8$-alkyl acrylates (monomers C32) used can comprise methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate, or 2-ethylhexyl acrylate, or else a mixture of these monomers with one another, particular preference being given to methyl acrylate.

The two graft shells (C2) and (C3) are prepared in the presence of the core (C1) by methods known from the literature, in particular via emulsion polymerization (Encyclopedia of Polymer Science and Engineering, Vol. 1, pages 401 et seq.). The "seed" procedure used here avoids formation of any new particles during preparation of the two graft shells. Furthermore the seed procedure permits determination of the number and the nature of the particles in both graft stages via the amount and the nature of the emulsifier used. The emulsion polymerization reaction is usually initiated via polymerization initiators.

Ionic and nonionic emulsifiers can be used in the emulsion polymerization reaction.

Suitable emulsifiers are, for example, dioctyl sodium sulfosuccinate, sodium lauryl sulfate, sodium dodecyl benzenesulfonate, alkylphenoxypolyethylenesulfonates and salts of long-chain carboxylic and long-chain sulfonic acids.

Examples of nonionic emulsifiers are fatty alcohol polyglycol ethers, alkylaryl polyglycol ethers, fatty acid monoethanolamides, ethoxylated fatty acid amides and the corresponding amines.

The total amount of emulsifier, based on the total weight of the emulsion graft copolymer, is preferably from 0.05 to 5% by weight.

Polymerization initiators which may be used comprise ammonium and alkali metal peroxodisulfates, such as potassium peroxodisulfate, and combined initiator systems, such as sodium persulfate, sodium hydrosulfite, potassium persulfate, sodium formaldehydesulfoxylate and potassium peroxodisulfate, sodium dithionite-iron(II) sulfate; in the case of the ammonium and alkali metal peroxodisulfates, which must be activated by heat, the polymerization temperature may be from 50 to 100° C., and in the case of the combined initiators which act as redox systems, it may be lower than this, for example in the range from 20 to 50° C.

The total amount of initiator is preferably between 0.02 and 1.0% by weight, based on the finished emulsion polymer.

It is also possible to use polymerization regulators, both in preparing the base stage, i.e. the core (C1), and also in preparing the two graft stages, i.e. the two graft shells (C2) and (C3). Examples of polymerization regulators are alkyl mercaptans, such as n-dodecyl or tert-dodecyl mercaptan. The usual amount used of the polymerization regulators is from 0.01 to 1.0% by weight, based on the respective stage.

In other respects, the emulsion graft copolymer to be used according to the invention is prepared by taking an aqueous mixture consisting of monomers, crosslinking agent, emulsifier, initiator, regulator and a buffer system in a reactor in which inert conditions have been established using nitrogen, stirring the mixture cold to create inert conditions and then bringing it to the polymerization temperature over the course of from 15 to 120 minutes. It is then polymerized to a conversion of at least 95%. Monomers, crosslinking agent, emulsifier, initiator and regulator may also be introduced entirely or to some extent in the form of a feed to the initial aqueous charge.

After the reaction has continued for from 15 to 120 minutes, if appropriate, the stages (C2) and (C3) are produced with feed of the monomers in the presence of the previously formed stage (C1), via emulsion polymerization.

The emulsion graft copolymer is isolated from the resultant latex in a known manner by precipitation, filtration and then drying. For the precipitation, it is possible to use, for example, aqueous solutions of inorganic salts, such as sodium chloride, sodium sulfate, magnesium sulfate and calcium chloride, aqueous solutions of salts of formic acid, such as magnesium formate, calcium formate and zinc formate, aqueous solutions of inorganic acids, such as sulfuric and phosphoric acid, aqueous solutions of ammonia and amines, and other alkaline aqueous solutions, e.g. of sodium hydroxide and potassium hydroxide. However, physical methods may also be used for the precipitation process, examples being freeze-precipitation, shear-precipitation, steam-precipitation.

The drying can, for example, be carried out by freeze-drying, spray-drying, fluidized-bed drying and air-circulation drying.

The precipitated emulsion graft copolymer may also be further processed without drying.

The swelling index SI of the graft copolymer (C) is preferably from 10 to 40, in particular from 12 to 35. This swelling index is determined via measurement of swelling in toluene at room temperature.

Component D:

The inventive thermoplastic molding composition uses, as component D, at least one polybutyl acrylate whose molar mass is from 1700 to 4000 g/mol (determined as $M_w$ by means of gel permeation chromatography).

The polybutyl acrylates are prepared via free-radical polymerization, and initiators that can be used here comprise azo compounds or peroxide compounds. Preparation of these compounds is described by way of example in "Encyclopedia of Polymer Science and Engineering", H. F. Mark (Ed.) J. Wiley & Sons, New York, 1985, pages 265 et seq., and processes for preparation are likewise described in the same document from page 269 et seq. The polybutyl acrylates can comprise up to 40% by weight, preferably up to 20% by weight, of one or more copolymerizable monomers. Preferred comoners are those selected from the group consisting of acrylates, methacrylates, styrene or its derivatives, maleic anhydride, acrylonitrile, and mixtures thereof.

It is preferable to use polybutyl acrylates which are liquid at room temperature.

Component E:

Conventional additives can, if appropriate, be present as component E in the inventive thermoplastic molding composition. If component E is present, its amount present is then preferably from 0 to 20% by weight, particularly preferably from 0 to 10% by weight, based in each case on the entirety of components (A) to (D).

The component (E) used can comprise any of the additives known to the person skilled in the art for thermoplastic molding compositions. In one preferred embodiment, additives are used which have good solubility in components (A) to (D) or good miscibility therewith. Particularly preferred additives are dyes, stabilizers, lubricants, and antistatic agents.

Examples of suitable stabilizers are 2,6-disubstituted phenols or organic phosphites. Preference is given to mixtures composed of at least one 2,6-disubstituted phenol and of at least one organic phosphite. These mixtures are described in detail in the specification WO 98/45365, expressly incorporated herein by way of reference (in which they are component (C)).

It is preferable to use 2,6-disubstituted phenols which have, in the 2- and/or 6-position, a quaternary carbon atom which has direct linkage to the aromatic ring. The tert-butyl group and the 1'-methylcyclohexyl group can be used as these substituents. Examples of suitable 2,6-diphenols are 2,6-di-tert-butyl-4-methylphenol, triethylene glycol 1,6-bis[3-(3,5-di(1,1-dimethylethyl)-4-hydroxyphenyl)propionate], butylated reaction products of p-cresol and dicyclopentadiene, e.g. CAS Reg. No. [68610-51-51], 2,2'-methylenebis(4-methyl-6-tert-butylphenol), 2,2'-methylenebis[4-methyl-6-(1-methylcyclohexyl)phenol], 2,2'-isobutylidenebis(4,6-dimethylphenol), tocopherol, pentaerythritol tetrakis[3-(3,5-bis(1,1-dimethylethyl)-4-hydroxyphenyl)propionate], and in particular octadecyl 3-[3,5-di(1,1-dimethylethyl)-4-hydroxyphenyl]propionate and 1,6-hexanediol bis[3-(3,5-di(1,1-dimethylethyl)-4-hydroxyphenyl)propionate].

The 2,6-diphenols listed can be used alone or in a mixture. Their amounts preferably used are from 0.02 to 5% by weight, particularly preferably from 0.05 to 1% by weight, and in particular from 0.1 to 0.5% by weight, based on the total weight of the polymer mixture.

Preferred organic phosphites used are triisooctyl phosphite, triisodecyl phosphite, trilauryl phosphite, diisooctyl phenyl phosphite, diisodecyl phenyl phosphite, dilauryl phenyl phosphite, isooctyl diphenyl phosphite, diphenyl isodecyl phosphite, diphenyl lauryl phosphite, bislauryl pentaerythrityl diphosphite, bisstearyl pentaerythrityl diphosphite, or a mixture of these.

The amounts preferably used of the organic phosphites listed are from 0.02 to 5% by weight, particularly preferably from 0.05 to 1% by weight, and in particular from 0.1 to 0.5% by weight, based on the total weight of the polymer mixture.

The inventive molding compositions can be prepared from components (A), (B), (C), (D), and, if appropriate, (E) by processes known to the person skilled in the art, for example via mixing of the components in the melt, using apparatuses known to the person skilled in the art, at temperatures in the range from 200 to 300° C., in particular from 200 to 280° C. The present invention also provides a process for preparation of an inventive thermoplastic molding composition via mixing of components (A) to (D) and, if appropriate, (E) in the melt, preferably at temperatures in the range from 200 to 300° C., particularly preferably from 200 to 280° C.

The present invention also provides a molding comprising an inventive thermoplastic molding composition.

The present invention also provides a process for production of these moldings via injection molding, blow molding, pressing, calendering, extrusion, vacuum forming, or a combination thereof.

The inventive thermoplastic molding compositions in particular feature good mechanical and optical properties. In particular, impact strength is independent of processing conditions.

The present invention also provides the use of the inventive thermoplastic molding composition for production of moldings.

The present invention moreover provides the use of polybutyl acrylate whose molar mass is from 1700 to 4000 g/mol (determined as $M_w$ by means of gel permeation chromatography) for improvement of the flowability and reduction of the dependency of notched impact strength and haze values of thermoplastic molding compositions, preferably of the inventive thermoplastic molding compositions, on injection-molding conditions, such as temperature.

EXAMPLES

In the inventive examples below and in the comparative examples, thermoplastic molding compositions are in each case prepared and the following properties are determined:

Refractive Index $n_D$ [Dimensionless]:

The refractive indices ($n_D$–C), ($n_D$–A), and ($n_D$–B) are measured on foils prepressed in an IWK press at 200° C. and at a pressure of from 3 to 5 bar for 2 min from the respective polymers and then finally further pressed at 200° C. and at 200 bar for 3 min. The measurements are made (see Ullmanns Encyklopädie der technischen Chemie [Ullmann's Encyclopedia of Industrial Chemistry], Volume 2/1, page 486, editor E. Foerst; Urban & Schwarzenberg, Munich-Berlin 1961) at 20° C. using an Abbé refractometer and the method for measuring the refractive indices of solid bodies.

The test specimens are produced by means of injection molding at a melt temperature of 250° C. and a mold temperature of 60° C. In order to demonstrate the independence of certain properties of the material under different conditions, test specimens are also produced at a melt temperature of 230 and 270° C. for measurement of notched impact strength and of optical properties.

MVR [ml/10']:
Melt volume rate (MVR) 220/10 to DIN EN ISO N33 is determined as a measure of flowability.

Notched Impact Strength $a_k$ [kJ/m²]:
Notched impact strength $a_k$ is determined to ISO 179 1 eA(F) at 23° C.

Fracture Energy Ws [Nm]:
Fracture energy is determined to ISO 6603 on plaques of dimensions 60 mm*60 mm*2 mm.

Transmittance T [%]:
Transmittance is determined to DIN 53236 on plaques of thickness 2 mm.

Haze [%]:
The haze value to ASTM D1003 is determined on test specimens of thickness 2 mm, as a measure of light scattering.

Vicat B [° C.]:
Vicat B heat distortion temperature is determined to ISO 306 on ISO specimens.

Mold Deposit:
After production of 100 ISO specimens, the surface of the mold was assessed qualitatively. O no deposit; + slight deposit; ** severe deposit Preparation of Molding Compositions:
The component A used comprises a copolymer composed of 95.5% by weight of methyl methacrylate and 4.5% by weight of methyl acrylate whose viscosity number VN is 70 ml/g (determined on a 0.5% strength by weight solution in dimethylformamide at 23° C. to DIN 53727), and whose refractive index is 1.4921.

The component B used comprises a copolymer composed of 81% by weight of styrene and 19% by weight of acrylonitrile whose viscosity number VN is 62 ml/g (determined on a 0.5% strength solution in dimethylformamide at 23° C. to DIN 53727), and whose refractive index is 1.5732.

Component C is prepared as follows: In a first stage, graft cores C1 are prepared by in each case first using nitrogen to inertize a solution composed of 186 parts by weight of water, 0.36 part by weight of sodium bicarbonate, 0.30 part by weight of potassium peroxodisulfate, and 0.55 part by weight of potassium stearate, and controlling the temperature of the mixture to 70° C. The following are then added, with stirring, within a period of 5 h: a mixture composed of 1 part by weight of tert-dodecyl mercaptan and 100 parts by weight of a mixture composed of butadiene and styrene whose constitution is 73/27% by weight, based on C1. The mixture is polymerized to at least 95% conversion. The average particle diameter $D_{50}$ of the graft cores C1 thus obtained from 73% by weight of butadiene and 27% by weight of styrene is 130 nm and their swelling index SI is 23.

In each case, two-stage graft copolymerization is used in the manner described below to prepare the graft copolymers C from the reaction mixtures obtained in the first stage and comprising the graft cores C1.

The following abbreviations are used here:

| | |
|---|---|
| Bu | Butadiene |
| S | Styrene |
| MMA | Methyl methacrylate |
| BA | Butyl acrylate |
| DCPA | Dihydrocyclopentadiene acrylate |

The reaction mixture comprising in each case the parts by weight stated in table 1 of graft cores C1 is used as initial charge and inertized with nitrogen. In each case, 0.1 part by weight of potassium stearate and 0.04 part by weight of potassium peroxodisulfate in 10 parts by weight of water are then added. A mixture of the monomers of which the first graft shell C2 is composed is then admixed in each case within a period of 1.5 h with this mixture, at 70° C., the C2 mixture in each case being composed of the parts by weight mentioned in table 1 of S, MMA and DCPA. After the end of the feed, the polymerization reaction for formation of the first graft shell C2 is continued for 15 min.

In each case, within the first 1.5 h, the parts by weight given in table 1 of a mixture of the monomers which form the second graft shell C3 are added to the resultant reaction mixtures, the C3 mixture in each case being composed of the parts by weight mentioned in table 1 of MMA and BA. The polymerization reaction is then continued for 60 minutes for formation of the second graft shell C3. A further 0.04 part by weight of potassium peroxodisulfate in, 10 parts by weight of water is then in each case added to the mixture and polymerization is continued for 1.5 h.

The resultant graft copolymers C are then isolated via precipitation using a 1% strength by weight magnesium sulfate solution, and, after washing with water, are dried in vacuo for 24 hours at 60° C.

TABLE 1

Constitution of C

| C1* | Constitution of C1** | C2* | Constitution of C2** | C3* | Constitution of C3** |
|---|---|---|---|---|---|
| 80 | 73 Bu<br>27 S | 10 | 32.7 S<br>65.3 MMA<br>2 DCPA | 10 | 85 MMA<br>15 BA |

*Parts by weight of components C1, C2, and C3 of which the graft copolymers C are composed, where the total parts by weight of C1, C2, and C3 is 100 parts by weight.
**Parts by weight and nature of monomers of which the respective components C1, C2, and C3 are composed, where the respective total is 100.

Component Dcomp1 (comparison)
Polybutyl acrylate whose molar mass is 1500 g/mol (determined as Mw by means of GPC, eluent THF, 23° C., polystyrene calibration).

Component D1 (inventive)
Polybutyl acrylate whose molar mass is 1900 g/mol (determined as Mw by means of GPC, eluent THF, 23° C., polystyrene calibration).

Component D2 (inventive)
Polybutyl acrylate whose molar mass is 3200 g/mol (determined as Mw by means of GPC, eluent THF, 23° C., polystyrene calibration).

Component Dcomp2 (comparison)
Polybutyl acrylate whose molar mass is 4400 g/mol (determined as Mw by means of GPC, eluent THF, 23° C., polystyrene calibration).

Component comp3 (comparison)
1 mol of glycerol×7.5 PO are mixed with 1 mol of diethyl carbonate in a three-necked flask equipped with stirrer, reflux condenser, and internal thermometer, and 250 ppm, based on the alcohol, of $K_2CO_3$ are added as catalyst. The mixture is then heated, with stirring, to 140° C., and stirred for 2 hours at this temperature. As the reaction time increases here, the temperature of the reaction mixture decreases by virtue of onset of evaporative cooling by the monoalcohol liberated. The reflux condenser is then replaced by an inclined condenser, ethanol is removed by distillation, and the temperature of the reaction mixture is slowly increased to 180° C.

The molecular weight of the reaction product is determined as follows: weight-average Mw and number-average Mn via gel permeation chromatography at 20° C. using four columns arranged in series (2×1000 A, 2×10 000 A), each column 600 mm*7.8 mm using PL-Gel from Phenomenex; eluent: dimethylacetamide, 0.7 ml/min, polymethyl methacrylate standard.

The molar mass Mw of the resultant polycarbonate is 4400 g/mol, its molar mass Mn is 2000 g/mol, its viscosity at 23° C. is 2500 mPas, and its OH number is 177 mg KOH/g.

The molding compositions given in table 2 are prepared from the parts by weight stated in table 2 of components A, B and C, in the melt at temperatures of 250° C.

TABLE 2

| Component | comp 1 | comp 2 | 3 | 4 | comp 3 | comp 4 |
|---|---|---|---|---|---|---|
| | Parts by weight | | | | | |
| A | 33.7 | 32.7 | 32.7 | 32.7 | 32.7 | 32.7 |
| B | 36.3 | 35.3 | 35.3 | 35.3 | 35.3 | 35.3 |
| C | 30 | 30 | 30 | 30 | 30 | 30 |
| Dcomp1 | 0 | 2 | — | — | — | — |
| D1 | 0 | — | 2 | — | — | — |
| D2 | 0 | — | — | 2 | — | — |
| Dcomp2 | 0 | — | — | — | 2 | — |
| comp3 | 0 | — | — | — | — | 2 |
| Parameters | Measured values | | | | | |
| MVR | 14.3 | 21.2 | 19.1 | 18.3 | 14.9 | 16.8 |
| $a_k$ 230° C. | 8.7 | 10.4 | 14.2 | 14.6 | 11.4 | 8.9 |
| $a_k$ 250° C. | 14.9 | 12.2 | 15.1 | 15.2 | 13.5 | 13.9 |
| $a_k$ 270° C. | 17.1 | 15.2 | 16.9 | 16.0 | 16.8 | 16.2 |
| Ws | 24.1 | 21.1 | 22.5 | 22.9 | 23.1 | 15.0 |
| T | 90.0 | 90.2 | 90.5 | 90.4 | 90.2 | 90.2 |
| Haze 230° C. | 6.7 | 5.6 | 4.6 | 5.1 | 6.0 | 6.7 |
| Haze 250° C. | 7.1 | 6.0 | 4.9 | 5.4 | 6.8 | 7.5 |
| Haze 270° C. | 10.2 | 7.4 | 5.5 | 6.0 | 8.2 | 9.1 |
| Vicat B | 90.4 | 88.1 | 88.7 | 88.8 | 89.2 | 85.6 |
| Mold deposit | 0 | ++ | 0 | 0 | 0 | 0 |

The examples provide evidence that the inventive molding compositions have improved flowability and good optical properties (high transparency, low haze). The inventive molding compositions moreover feature optical properties and notched impact strength independent of processing.

The invention claimed is:

1. A thermoplastic molding composition, comprising a mixture composed of
   (A) at least one methyl methacrylate polymer, obtainable via polymerization of a mixture, composed of
      (A1) methyl methacrylate, and
      (A2) at least one $C_1$-$C_8$-alkyl acrylate, as monomers, as component (A),
   (B) at least one copolymer, obtainable via polymerization of a mixture, composed of
      (B1) at least one vinylaromatic monomer, and
      (B2) at least one vinyl cyanide, as monomers, as component (B),
   (C) at least one graft copolymer, obtainable from
      (C1) a core, and
      (C2) a first graft shell, obtainable via polymerization of a monomer mixture, composed of
         (C21) at least one vinylaromatic monomer,
         (C22) at least one $C_1$-$C_8$-alkyl methacrylate, and
         (C23) optionally, at least one crosslinking monomer, as monomers,
      and
      (C3) a second graft shell, obtainable via polymerization of a monomer mixture, composed of
         (C31) at least one $C_1$-$C_8$-alkyl methacrylate, and
         (C32) at least one $C_1$-$C_8$-alkyl acrylate, as monomers,
      as component (C),
   (D) at least one polybutyl acrylate whose molar mass is from 1700 to 4000 g/mol (determined as $M_w$ by means of gel permeation chromatography), as component (D), and
   (E) optionally, conventional additives, as component (E).

2. The thermoplastic molding composition according to claim 1, which comprises
   an amount of from 20 to 68.9% by weight, based on the entirety of components (A) to (D), of component (A),
   an amount of from 20 to 69% by weight, based on the entirety of components (A) to (D), of component (B),
   an amount of from 1 to 60% by weight, based on the entirety of components (A) to (D), of component (C),
   an amount of from 0.1 to 5% by weight, based on the entirety of components (A) to (D), of component (D), and
   an amount of from 0 to 20% by weight, based on the entirety of components (A) to (D), of component (E).

3. The thermoplastic molding composition according to claim 1, wherein, in component (A), the amount present of (A1) is from 92 to 98% by weight and the amount present of (A2) is from 2 to 8% by weight, based in each case on (A).

4. The thermoplastic molding composition according to claim 1, wherein, in component (B), the amount present of (B1) is from 75 to 88% by weight and the amount present of (B2) is from 12 to 25% by weight, based in each case on (B).

5. The thermoplastic molding composition according to claim 1, wherein, in component (C), the amount present of (C1) is from 60 to 90% by weight, the amount present of (C2) is from 5 to 20% by weight, and the amount present of (C3) is from 5 to 20% by weight, based in each case on (C).

6. A process for preparation of a thermoplastic molding composition according to claim 1 via mixing of components (A) to (D) and, optionally, (E) in the melt.

7. The process according to claim 6, wherein the mixing is carried out at a temperature of from 200 to 300° C.

8. A molding, comprising a thermoplastic molding composition according to claim 1.

9. A process for production of moldings according to claim 8 via injection molding, blow molding, pressing, calendering, extrusion, vacuum forming, or a combination thereof.

10. A method of producing moldings comprising preparing the thermoplastic molding composition according to claim 1.

11. A method of improving flowability and reducing of the dependency of notched impact strength and haze values of thermoplastic molding compositions under injection-molding conditions comprising preparing the thermoplastic molding composition according to claim 1.

12. The thermoplastic molding composition according to claim 2, wherein, in component (A), the amount present of (A1) is from 92 to 98% by weight and the amount present of (A2) is from 2 to 8% by weight, based in each case on (A).

13. The thermoplastic molding composition according to claim 2, wherein, in component (B), the amount present of (B1) is from 75 to 88% by weight and the amount present of (B2) is from 12 to 25% by weight, based in each case on (B).

14. The thermoplastic molding composition according to claim 3, wherein, in component (B), the amount present of (B1) is from 75 to 88% by weight and the amount present of (B2) is from 12 to 25% by weight, based in each case on (B).

15. The thermoplastic molding composition according to claim 2, wherein, in component (C), the amount present of (C1) is from 60 to 90% by weight, the amount present of (C2) is from 5 to 20% by weight, and the amount present of (C3) is from 5 to 20% by weight, based in each case on (C).

16. The thermoplastic molding composition according to claim 3, wherein, in component (C), the amount present of (C1) is from 60 to 90% by weight, the amount present of (C2) is from 5 to 20% by weight, and the amount present of (C3) is from 5 to 20% by weight, based in each case on (C).

17. The thermoplastic molding composition according to claim 4, wherein, in component (C), the amount present of (C1) is from 60 to 90% by weight, the amount present of (C2) is from 5 to 20% by weight, and the amount present of (C3) is from 5 to 20% by weight, based in each case on (C).

18. A process for preparation of a thermoplastic molding composition according to claim 2 via mixing of components (A) to (D) and, optionally, (E) in the melt.

19. A process for preparation of a thermoplastic molding composition according to claim 3 via mixing of components (A) to (D) and, optionally, (E) in the melt.

20. A process for preparation of a thermoplastic molding composition according to claim 4 via mixing of components (A) to (D) and, optionally, (E) in the melt.

* * * * *